United States Patent [19]

Irvine et al.

[11] Patent Number: 4,692,338

[45] Date of Patent: Sep. 8, 1987

[54] MILK SUBSTITUTE

[76] Inventors: Sheila M. Irvine, 8 Starling Way, Brickhill, Bedfordshire; Alistair Penman, 8 Bewcastle Close, Bedford; Geoffrey B. Wood, 41 Salisbury Road, Harpenden, Hertfordshire, all of England

[21] Appl. No.: 716,609

[22] Filed: Mar. 28, 1985

Related U.S. Application Data

[63] Continuation of Ser. No. 469,473, Mar. 2, 1983, abandoned, which is a continuation of Ser. No. 301,198, Sep. 11, 1981, abandoned, which is a continuation of Ser. No. 194,294, Apr. 21, 1980, abandoned.

[30] Foreign Application Priority Data

Aug. 25, 1978 [GB] United Kingdom ............... 34723/78

[51] Int. Cl.⁴ ............................................. A23K 1/18
[52] U.S. Cl. ......................................... 426/2; 426/335; 426/532; 426/583; 426/588; 426/807
[58] Field of Search .................. 426/2, 335, 532, 580, 426/583, 585, 588, 807

[56] References Cited

U.S. PATENT DOCUMENTS

| | | | |
|---|---|---|---|
| 3,174,866 | 3/1965 | Saperstein | 99/54 |
| 3,560,220 | 2/1971 | Bangert | 99/63 |
| 3,649,291 | 3/1972 | Van Elten | 99/2 |
| 3,798,339 | 3/1974 | Peng | 426/357 |
| 4,054,677 | 10/1977 | Orban | 426/602 |
| 4,081,555 | 3/1978 | Sanhill | 426/2 |
| 4,132,808 | 1/1979 | Kakade | 426/2 |

FOREIGN PATENT DOCUMENTS

| | | |
|---|---|---|
| 1239551 | 4/1967 | Fed. Rep. of Germany . |
| 1257153 | 2/1961 | France . |
| 1466221 | 12/1966 | France . |
| 2373236 | 7/1978 | France . |
| 7806635 | 12/1978 | Netherlands . |
| 1350647 | 4/1974 | United Kingdom . |
| 1507380 | 4/1978 | United Kingdom . |

OTHER PUBLICATIONS

"Aktuelle Themen der Tierernährung und Veredelungswirtschaft", Lohmann Tierernährung GmbH, Oct. 13–14, 1977.

Primary Examiner—R. B. Penland
Attorney, Agent, or Firm—Kramer, Brufsky & Cifelli

[57] ABSTRACT

A milk substitute suitable for feeding young mammalian animals in the form of an unreconstituted powder, containing more than 10% casein, is given an extended storage life following reconstitution by the presence of a pH-responsive preservative, such as propionate, an edible acid, such as malic acid, which generates a pH in the milk substitute immediately after reconstitution in the range 6 to 5.2, and optionally a water-soluble phosphate.

24 Claims, No Drawings

MILK SUBSTITUTE

This application is a continuation of application Ser. No. 469,473 filed Mar. 2, 1983, now abandoned, which was a continuation of application Ser. No. 301,198 filed Sept. 11, 1981, now abandoned. Application Ser. No. 301,198 was a continuation of application Ser. No. 194,294 filed Apr. 21, 1980 now abandoned.

The present invention relates to milk substitutes in powder form which when mixed with an appropriate quantity of water provide a milk-like liquid suitable for feeding to mammalian young such as calves, lambs and piglets.

Conventional milk substitutes are generally based on skimmed milk powder and fat, fortified with added minerals, vitamins, growth promotors and other minor ingredients. Whey powder, and non-milk proteins such as soya protein, can be included. These conventional milk substitutes have excellent nutritional properties, but in practice suffer from the defect that following reconstitution with water they acidify through bacterial action and this leads to undesirable coagulation. The maximum time that such a milk substitute can be left unconsumed after reconstitution during the summer is 36 hours, and if a residue of this unconsumed material is allowed to remain in a storage vessel which is topped up with freshly reconstituted milk substitute, the mixture will be unusable within a further 24 hours. In farming situations this problem of spoilage increases labour costs because the stockman must clean out his storage vessels and replenish them with freshly reconstituted milk substitute on a daily basis, in order to ensure that his animals are receiving uncoagulated feed. The consequences of not maintaining such a strict regime are poor feed intakes and poor feed conversions, and a constant risk of serious gastro-intestinal infections (scouring) which can further retard growth or even lead to death. Further coagulation of the feed can cause blockage of teats and other feeding mechanisms. Also, the unattractive appearance of the coagulated feed may cause the careful stockman to discard the feed prematurely even though bacteriologically it could still be fed safely to the animals.

A recent development has been the marketing of milk substitutes which incorporate mixtures of edible organic acids and salts of such acids which appear to impart longer storage life after reconstitution. These acidified milk substitutes are all based principally on whey powder, and contain only minor amounts of skimmed milk powder or caseinates. Clearly it would be beneficial to enhance similarly the storage life of milk substitutes that contain substantial amounts of milk powder or caseinates. Advantage could thus be taken of the ready availability of skimmed milk powder, of which there is currently an embarassing surplus. However, the addition of acids of milk substitutes containing milk powder could cause immediate coagulation of casein on reconstitution. Coagulation of casein is known to occur at pH 4.7 and below, but even where the nominal pH of the reconstituted product is higher than 4.7 it is possible that localise concentration of high acidity could occur during reconstitution, leading to the development of curds. In the formulation of an acidified milk substitute containing substantial amounts of casein it is essential therefore to ensure that the occurence of any such local concentrations is minimised.

By the present invention we are able to provide a milk substitute in the form of an unreconstituted powder containing by weight more than 10% casein which does not exhibit significant casein coagulation on reconstitution and which has after reconstitution a storage life, at the typical ambient temperatures encountered in temperate latitudes, of more than 36 hours. Further, the invention can provide such a milk substitute having a storage life after reconstitution of more than 48 hours, and even as long as 3 to 4 days. Moreover, by the invention we are able to provide milk substitutes having such improved storage capacities after reconstitution in which the casein level is at least 15%, and even 20% or more, by weight.

A particular embodiment of the invention is a milk substitute in the form of an unreconstituted powder containing, by weight, more than 10% casein, an acid-responsive food grade preservative, and an edible acidifying system that generates a pH value in the milk substitute immediately after reconstitution in the range 6.0 to 5.2, preferably 5.9 to 5.3, and ideally 5.6 to 5.4.

The invention includes a method of rearing young mammalian animals, such as calves, wherein the animals are provided on an individual or group basis with a quantity of liquid feed reconstituted from a milk substitute of the invention, the liquid feed being presented in a manner such that the animals can drink ad lib thereof and the quantity being sufficient to sustain the animals for a period of more than 36 hours, preferably from 3 to 4 days.

By an acid-responsive preservative we mean a preservative the effectiveness of which increases as pH decreases. The most preferred preservatives are water-soluble propionates, ideally present as sodium or calcium salts. Alternatives are acetates and foformates. In general the preservatives will comprise at least 0.5%, and ideally at least 1%, by weight of the milk substitute. In general, the preservative will not comprises more than 5%, and typically not more than 2%, by weight of the milk substitute. Mixtures of two or more preservatives can be used if desired, the above percentages than being taken as indicating the total preservative content of the milk substitute. In addition, preservatives that are not acid-responsive can be incorporated, paraformaldehyde being an example. For flavour and aroma reasons, it is preferably that only trace amounts of formaldehyde-generating preservatives should be used, typically comprising not more than 0.2% by weight of the milk substitute.

The edible acidifying system can comprise one or more readily water-soluble solid, preferably crystalline, organic acids, such as malic acid, citric acid or tartaric acid. Malic acid is the most preferred. Fumaric acid can also be used, but tends not to be as readily water-soluble as the acids already mentioned and can lead to mixing problems when the milk substitute is reconstituted; it is therefore not preferred. These solid acids are particularly suitable for use in milk substitutes whose manufacture involves the dry mixing of their individual ingredients. Alternatively, or in addition, certain edible liquid organic acids can be used in minor amounts, these being blended with dry ingredients or added to milk prior to the production of milk powder by spray-drying. Suitable liquid acids include formic acid and acetic acid. The total quantity of acid present will generally lie in the range 0.1 to 2% by weight of the milk substitute.

For nutritional reasons it is often desirable to include phosphate in a milk substitute. Generally this is included in conventional milk substitutes as calcium hydrogen phosphate, despite the fact that it is relatively insoluble in water. However, in the context of the present invention, ideally calcium hydrogen phosphate should be omitted entirely, and if used at all it should be kept on an absolute minimum. We prefer to use water-soluble phosphates, particularly as these appear to assist in preventing coagulation of the high-casein milk substitutes of the invention. Sodium dihydrogen phosphate is most preferred. Disodium hydrogen phosphate can also be used, either alone or in a buffering combination with sodium dihydrogen phosphate. Generally the soluble phosphate need not comprise more than 2% by weight of the milk substitute.

A most preferred embodiment of the invention is a milk substitute in the form of an unreconstituted powder containing, by weight more than 10% casein, from 0.5 to 2%, preferably 0.5 to 1.5%, calcium propionate, from 0.1 to 2%, preferably 0.1 to 1%, malic acid and from 0.1 to 1.5% sodium dihydrogen phosphate.

In addition to the acid-responsive edible preservative and edible acidifying system, and phosphate when present, a milk substitute in accordance with the invention can contain any of the standard ingredients used in conventional milk substitutes. Typically these are 50 to 80% skimmed milk powder, 10 to 25% fat, 0 to 30% of spray-dried whey powder and/or non-milk proteins such as soya protein, fish meal, single-cell protein and legume meal, and a total of up to 10% minerals, vitamins and other minor additives.

All percentages given throughout this specification are expressed by weight of the milk substitute in the form of an unreconstituted powder because this is the physical form in which milk substitutes are sold commercially. Reconstitution of the milk substitute into a drinkable product for feeding to young mammalian animals will entail mixing the dry powder with an appropriate quantity of water in the conventional manner. As a precaution against casein coagulation, it is sensible to avoid the use of hot water in the reconstitution of the milk substitute, and therefore water at a temperature below 50° C. is reccommended. Cold water can be used. Typically the quantity of the dry powder used will be 80 to 200 g per liter of water.

Manufacture of a milk substitute of the invention can be accomplished by simple dry mixing of the individual ingredients. Alternatively, the ingredients can be added to liquid milk prior to the conventional spray-drying of milk to yield milk powder.

The invention is illustrated by the following Examples.

EXAMPLE 1

A milk substitute for calves, based on fat-filled skimmed milk powder, was prepared by dry mixing and contained, by weight, 17.0% casein, 6.0% whey protein, 45% lactose, 17.0% fat, 1.5% calcium propionate, 0.6% malic acid, 0.5% sodium dihydrogen phosphate monohydrate, 0.05% "Payzone" (a commercially-available growth promoting additive containing by weight thereof 5% nitrovin, which may have some beneficial enhancing effect on the preservation system of the invention) and sundry conventional minerals, vitamins and moisture. The milk substitute was reconstituted in tap water at 40° C., at a level of 125 g per liter of water. After thorough mixing, the minimum pH record d was 5.50 and the reconstituted product had a normal uncoagulated milk-like appearance. The pH was recorded as 5.86 two hours later. After standing at ambient temperature (approximately 20° C.) for 3 days, the pH of the product had dropped to 5.31. After a further 24 hours the pH was 5.16, but throughout the period the product remained un-coagulated and looked and smelled wholesome.

COMPARATIVE EXAMPLE

In contrast, a milk substitute of essentially similar formulation but containing no calcium propionate or malic acid, reconstituted in exactly the same manner and at the same time, and stored under identical conditions, had within two days the appearance and smell of a product obviously spoiled by microbiological activity.

EXAMPLE 2

A milk substitute for calves, of formulation similar to that of Example 1 but containing malic acid at a level of 0.5% by weight instead of 0.6%, was reconstituted and stored under conditions strictly comparable with those applied in Example 1. The lowest pH recorded immediately following reconstitution was 5.50. After three days the pH of the product was 5.20, but the product was still uncoagulated and fully satisfactory in all respect.

EXAMPLES 3 and 4

Two milk substitutes for calves of formulations similar to that of (Example 1, but containing citric acid Example 3) and fumaric acid (Example 4) respectively at a level of 0.6% in place of the malic acid, were reconstituted and stored under conditions strictly comparable with those applied in Example 1.

The milk substitute of Example 3, containing citric acid, began to sour after 3 days, but was entirely satisfactory up to that time.

The milk substitute of Example 4, containing fumaric acid, exhibited some scum formation on initial mixing, but in terms of freedom from scouring was equal to the milk substitute of Example 1. The sum formation appeared to be due to an interaction between the fumaric acid and the fat in the formulation. This slight problem did not occur when the milk substitute was reconstituted using cool (below 18° C.) water.

EXAMPLE 5

A milk substitute for calves, based on fat-filled skimmed milk powder, was prepared by dry mixing and contained, by weight, 17.0% casein, 6.0% whey powder, 45% lactose, 17.0% fat, 1.5% calcium propionate as preservative, 0.3% malic acid, plus sundry minerals, vitamins and moisture. No phosphate was present. The milk substitute was reconstituted and stored as in Example 1. This product reconstituted smoothly without any significant casein precipitation and has an initial pH of 5.4. It remained uncoagulated and whole-some for over three days.

EXAMPLES 6 to 8

Three milk substitutes for calves, each having a formulation identical to that of Example 1, with the exception that the added phosphate salt content was as indicated below, were reconstituted and stored as in Example 1.

| | Ex. 6 | Ex. 7 | Ex. 8 |
|---|---|---|---|
| $NaH_2PO_4$ (%) | 0.4 | 0.3 | 0.2 |

|  | Ex. 6 | Ex. 7 | Ex. 8 |
|---|---|---|---|
| Na$_2$HPO$_4$ (%) | 0.1 | 0.2 | 0.3 |
| Total | 0.5 | 0.5 | 0.5 |

Compared to the performance of the milk substitute of Example 1, which contained 0.5% of sodium dihydrogen phosphate only, these three formulations showed a slight tendency to curdle on reconstitution, increasing with increasing proportion of the disodium salt. Nevertheless, each formulation was considered to be acceptable from this point of view. As expected from the relatively more alkaline nature of the disodium salt, the formulations of Examples 7 and 8 had slightly higher initial pH values immediately following reconstitution, but in performance terms the storage life of each reconstituted product was satisfactory as each lasted for more than three days before any serious souring became evident.

We claim:

1. A milk substitute in dry powder form, reconstitutable with water to provide a milk-like liquid suitable for feeding to mammalian young, the unreconstituted powder consisting essentially of, by weight, from 50 to 80 percent skim milk powder, at least 0.5% by weight of an acid-responsive food grade preservative selected from the group consisting of water-soluable propionates, acetates, formates, and mixtures thereof, and an edible acidifying system selected from the group consisting of malic acid, citric acid, tartaric acid, formic acid, acetic acid and mixtures thereof, in an amount sufficient to generate a pH value in the milk substitute immediately after reconstitution in the range of 6.0 to 5.2.

2. A milk substitute according to claim 1, wherein the edible acidifying system generates a pH value in the milk substitute immediately after reconstitution in the range of 5.9 to 5.3.

3. A milk substitute according to claim 2, wherein the edible acidifying system generates a pH value in the milk substitute immediately after reconstitution in the range of 5.6 to 5.4.

4. A milk substitute according to claim 1 wherein the preservative is a water-soluble propionate.

5. A milk substitute according to claim 4 wherein the propionate is present as its sodium or calcium salt.

6. A milk substitute according to claim 1 wherein the total preservative content is at least 1% by weight.

7. A milk substitute according to claim 1 wherein paraformaldehyde is used as an additional preservative.

8. A milk substitute according to claim 1 wherein the total preservative content is not more than 5% by weight.

9. A milk substitute according to claim 1 wherein the acidifying system is selected from the group consisting of malic acid, citric acid, tartaric acid, or mixtures thereof.

10. A milk substitute according to claim 9 wherein the acidifying system comprises malic acid.

11. A milk substitute according to claim 1 wherein the total quantity of acid present is in the range of 0.1 to 2% by weight.

12. A milk substitute according to claim 1 containing no calcium hydrogen phosphate.

13. A milk substitute according to claim 1 which incorporates a water-soluble phosphate.

14. A milk substitute according to claim 13 wherein the water-soluble phosphate is a member selected from the group consisting of sodium dihydrogen phosphate, disodium hydrogen phosphate, or buffering mixtures thereof.

15. A milk substitute in the form of a dry unreconstituted powder consisting essentially of, by weight from 50 to 80 percent skim milk powder, from 0.5 to 2% calcium propionate, from 0.1 to 2% malic acid and from 0.1 to 1.5% sodium dihydrogen phosphate.

16. A milk substitute according to claim 15 containing from 0.5 to 1.5% calcium propionate.

17. A milk substitute according to claim 15 containing from 0.1 to 1% malic acid.

18. A milk substitute according to claim 1 which consists essentially of, by weight, 50 to 80% skimmed milk powder, 10 to 25% fat, 0 to 30% spray-dried whey powder and/or non-milk proteins, and a total of up to 10% minerals, vitamins and other conventional additives.

19. A milk substitute in dry powder form consisting essentially of from 50 to 80% by weight skimmed milk powder, reconstitutable with water to provide a milk-like liquid suitable for feeding to young mammalian animals, the milk substitute additionally comprising an acid-responsive food grade preservative selected from the group consisting of water-soluble propionates, acetates, formates, and mixtures thereof and an edible acidifying system that together provide the reconstituted milk substitute with a storage life, at the typical ambient temperatures encountered in temperate latitudes, of more than 36 hours, but which do not lead to significant acid-induced casein coagulation on reconstitution of the milk substitute, the reconstituted milk substitute thereby being suitable for use in ad lib feeding of young mammalian animals.

20. A milk substitute according to claim 19 wherein the acid-responsive food grade preservative is a member selected from the group consisting of sodium propionate, calcium propionate or mixtures thereof, in an amount of from 0.5 to 5% by weight of the milk substitute.

21. A milk substitute according to claim 19 wherein the edible acidifying system is a member selected from the group consisting of malic acid, citric acid, tartaric acid or mixtures thereof, in a total amount of from 0.1 to 2% by weight of the milk substitute.

22. A milk substitute according to claim 19 additionally comprising a water-soluble phosphate.

23. A milk substitute according to claim 22 wherein the water-soluble phosphate is sodium dihydrogen phosphate in an amount of not more than 2% by weight of the milk substitute.

24. A method of rearing young mammalian animals comprising feeding said animals, on an individual or group basis, with a quantity of liquid feed reconstituted from a milk substitute which, in dry powder form consists essentially of, by weight, from 50 to 80 percent skim milk powder, at least 0.5% by weight of an acid-responsive food grade preservative selected from the group consisting of water-soluble propionates, acetates, formates, and mixtures thereof, and an edible acidifying system selected from the group consisting of malic acid, citric acid, tartaric acid, formic acid, acetic acid and mixtures thereof, in an amount sufficient to generate a pH value in the milk substitute immediately after reconstitution in the range of 6.0 to 5.2.

* * * * *

UNITED STATES PATENT AND TRADEMARK OFFICE
CERTIFICATE OF CORRECTION

PATENT NO. : 4,692,338

DATED : September 8, 1987

INVENTOR(S) : Irvine, et al

It is certified that error appears in the above-identified patent and that said Letters Patent is hereby corrected as shown below:

In Claim 19, line 35 thereof, "ad lib" should read -- *ad lib* -- .

Signed and Sealed this

Eighth Day of March, 1988

Attest:

DONALD J. QUIGG

*Attesting Officer*     *Commissioner of Patents and Trademarks*